US009462358B2

(12) United States Patent
Caviglia et al.

(10) Patent No.: US 9,462,358 B2
(45) Date of Patent: Oct. 4, 2016

(54) APPARATUS AND METHOD FOR AN OPTICAL NETWORK

(75) Inventors: Diego Caviglia, Savona (IT); Giulio Bottari, Leghorn (IT); Riccardo Martinotti, Savona (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/239,308

(22) PCT Filed: Oct. 12, 2011

(86) PCT No.: PCT/EP2011/067776
§ 371 (c)(1),
(2), (4) Date: May 22, 2014

(87) PCT Pub. No.: WO2013/026499
PCT Pub. Date: Feb. 28, 2013

(65) Prior Publication Data
US 2014/0294383 A1     Oct. 2, 2014

(30) Foreign Application Priority Data

Aug. 25, 2011 (EP) ................................ 11178755

(51) Int. Cl.
*H04J 14/02* (2006.01)
*H04Q 11/00* (2006.01)

(52) U.S. Cl.
CPC .......... *H04Q 11/0005* (2013.01); *H04J 14/02* (2013.01); *H04J 14/0212* (2013.01); *H04J 14/0294* (2013.01); *H04J 14/0284* (2013.01); *H04Q 2011/0016* (2013.01); *H04Q 2011/0037* (2013.01)

(58) Field of Classification Search
CPC .................................................. H04J 14/0212
See application file for complete search history.

(56) References Cited

U.S. PATENT DOCUMENTS

2010/0111534 A1* 5/2010 Veselka et al. ................ 398/79

OTHER PUBLICATIONS

Prasanna et al., Versatility of a colorless and directionless WSS based ROADM architecture, Communication Systems and Networks and Workshops, 2009, COMSNETS 2009, First International, IEEE, Piscataway, NJ, USA, Jan. 5, 2009, pp. 1-8.*

(Continued)

*Primary Examiner* — Nathan Curs
(74) *Attorney, Agent, or Firm* — Rothwell, Figg, Ernst & Manbeck, P.C.

(57) ABSTRACT

An optical network is configured to provide an optical reroute over a backup path ($213_9$) during a failure in a signal path ($213_3$). The network comprises a first node (B). A second node (C) is coupled to receive a signal from the first node (B) via the signal path ($213_3$), and a backup signal via the backup path ($213_9$). The network is adapted to transmit a signal and a corresponding backup signal from the first node to the second node even when there is no failure in the signal path ($213_3$), wherein the backup signal is blocked at the second node (C) when there is no failure in the signal path ($213_3$). Embodiments of the invention utilize the broadcast and blocking functionalities of a wavelength selective switch (WSS) device. Such WSS devices enable, in the case of a failure of a link, the fast switchover of optical traffic onto local detours within a reduced time.

12 Claims, 10 Drawing Sheets

(56) References Cited

OTHER PUBLICATIONS

Prasanna, G., et al., "Versatility of a colorless and directionless WSS based ROADM architecture", Communication Systems and Networks and Workshops, 2009, COMSNETS 2009, First International, IEEE, Piscataway, NJ, USA, Jan. 5, 2009, pp. 1-8, XP031445307.

Schupke, D.A., "ROADM-Based Restoration with Bounded End Hops", Advanced Networks and Telecommunication Systems, 2007 First International Symposium on, IEEE, Piscataway, NJ, USA, Dec. 17, 2007, pp. 1-2, XP031351786.

First Office Action issued by the State Intellectual Property Office of China in corresponding Application No. 201180073046.0 dated Feb. 16, 2016, 6 pages.

Search Report issued by the State Intellectual Property Office of China in corresponding Application No. 201180073046.0 dated Feb. 3, 2016, 2 pages.

\* cited by examiner

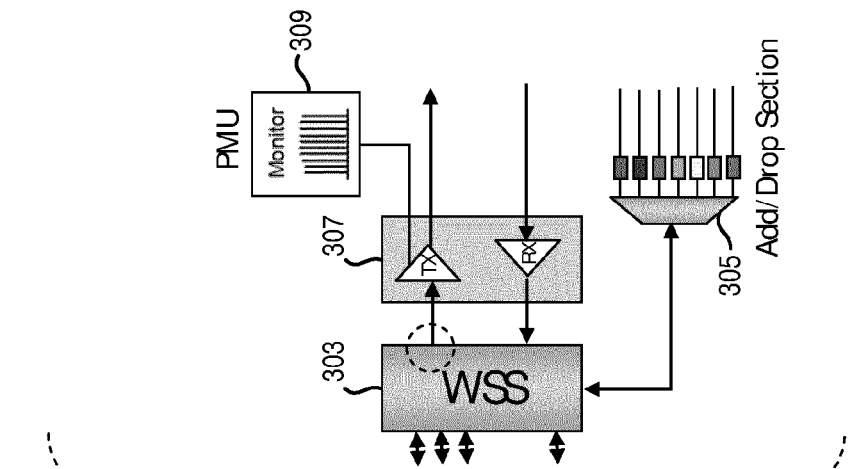
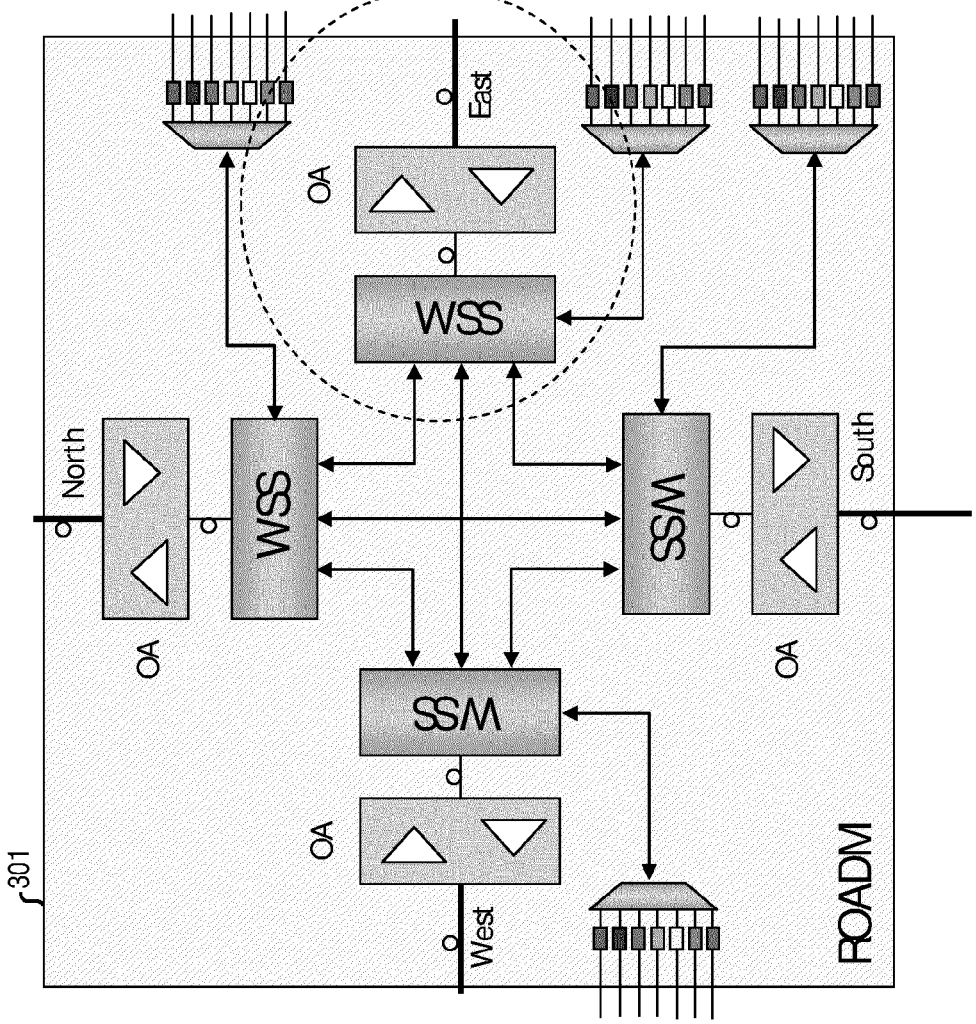
Figure 3a
Figure 3b

APPARATUS AND METHOD FOR AN OPTICAL NETWORK

CROSS-REFERENCE TO RELATED APPLICATIONS

This application is a 35 U.S.C. §371 National Phase Entry Application from PCT/EP2011/067776, filed Oct. 12, 2011, and designating the United States, which claims priority to European Application No. 11178755.2, filed Aug. 25, 2011. The above-identified applications are incorporated by reference.

TECHNICAL FIELD

The present invention relates to an apparatus and method for an optical network, and in particular to an optical network having wavelength selective switches.

BACKGROUND

Wavelength Selective Switch (WSS) devices have become important aspects of modern optical networks, such as Dense Wavelength Division Multiplexing (DWDM) reconfigurable optical networks. A WSS device can dynamically route, broadcast, block and attenuate all DWDM channels within a network node.

Referring to FIG. 1, a WSS device 101 comprises a common multi-channel optical input port 103 for receiving multi-channel optical signals 105, and N opposing multi-wavelength ports 107. Each DWDM wavelength input from the common input port 103 can be switched to any one of the N multi-wavelength output ports 107, independent of how all other wavelength channels are routed. Current WSS devices are 1×N devices, while N×M WSS devices are today the object of medium term research. In the meantime, 1×N WSS devices can be cascaded to form larger architectures, for example whereby N×N wavelength selective matrix devices can be built by interconnecting, back-to-back, several 1×N WSS devices.

The wavelength switching process can be dynamically changed through an electronic communication control interface on the WSS device. For example, a mechanism based on Variable Optical Attenuation (VOA) operates in a WSS device for controlling each wavelength. As such, each wavelength can be independently attenuated for channel power control and equalization, or completely blocked.

Because every wavelength in the 1×N WSS device can be switched to any one of the N output ports 107, this switch can be used in a fully flexible Reconfigurable Optical Add Drop Multiplexer (ROADM) with multiple optical ports, each of which carries multiple wavelengths, coupled with respective add/drop sections where the client traffic is added/dropped in the node.

Fast ReRoute (FRR), also called local restoration, is a local restoration network resiliency mechanism. In a one-to-one Fast ReRoute for a link protection recovery technique, a Label Switched Path (LSP) passing through a link is protected by a backup path which originates at the node immediately upstream to that link. This local mechanism provides faster recovery because the decision concerning recovery is strictly local and does not involve the overall node chain. This recovery scheme has been defined and specified only for packet networks until now, as defined in Internet Engineering Task Force (IETF) RFC 4090. In the current field of Wavelength Switched Optical Networks (WSON), a practical implementation of a Fast ReRroute mechanism is prevented due to the time required for power leveling (or power equalization) operations that need to be carried out after a rerouting procedure, as will be explained below.

The power of a transmitter line amplifier is given by a fixed relationship between the number of active channels and the profile of the amplifier. The output power of the transmitter amplifier is given by the type of profile and the total number (M) of channels present in the line. M is given by the sum of already present channels (M−1) and the number of channels that have been added (usually one at a time).

Every time a new channel is activated or switched off in transmission, a new power leveling or equalization procedure is required. In particular, there is the need to adjust both the total power and the per-channel power, and this implies a set of subsequent leveling adjustment that lead to a long set-up time.

FIGS. 2a and 2b show how a FRR procedure would be implemented according to known techniques. Referring to FIG. 2a, when transmitting traffic from Node A to Node D, (i.e. along links $213_1$, $213_2$, $213_3$, $213_4$ and $213_5$), a node along this path, for example Node B, is shown as having a duplication of traffic towards Node C and Node E. When the link $213_3$ between Node B and Node C is operating correctly, the traffic directed to Node E is blocked by a mechanism 205 based on Variable Optical Attenuation (VOA) in Node B (shown as a shaded rectangle). Therefore, in this mode, the flow of traffic is shown by the dotted lines, whereby the main flow of traffic flows from Node A to Node D along the links $213_1$, $213_2$, $213_3$, $213_4$ and $213_5$, and wherein the flow of duplicated traffic flows along the links $213_1$, $213_6$. As such, the flow of duplicate or backup traffic is blocked at Node B using the VOA 205.

Referring to FIG. 2b, when a failure occurs in the link $213_3$, the VOA 205 is tuned to feed the traffic to Node C via Node E, (i.e. along the links $213_7$, $213_8$ and $213_9$), thereby bypassing the failed line $213_3$ with a local detour via Node E. The flow of traffic is shown by the dotted lines, whereby the main flow of traffic flows from Node A to Node B along the links $213_1$, $213_2$, but stops at the VOA 203 because of the failure of the link $213_3$. The duplicated or backup traffic flows from Node A to Node D via the detour from Node B to Node E to Node C, i.e. along the links $213_6$, $213_7$, $213_8$, $213_9$ and $213_{10}$).

It can be noted that the transmitter side of Node B, along the line B-E (i.e. path $213_7$) is involved with the addition of one new channel. This requires power leveling adjustments in Nodes B and E.

This can be appreciated from FIGS. 3a and 3b, which show further details of a typical node, such as Node B of FIGS. 2a and 2b.

A ROADM node comprises two or more DWDM ports. In the example of FIG. 3a, a ROADM node 301 is shown as comprising four ports, which are labeled north, south, east and west. Each port, as shown in further detail in FIG. 3b, comprises a wavelength selective switch 303. Each wavelength selective switch is coupled to an add/drop multiplexer 305 that is adapted to add or drop a wavelength channel. An operational amplifier unit 307 comprises transmit and receive amplifiers. A power management unit 309 monitors the power level of a transmitter (and/or a receiver although not shown), to determine whether any channels are present in the outgoing DWDM flow. When a channel is added or dropped, power leveling or equalization must be performed, which causes an undesirable delay.

Prior to the introduction of a Generalized Multi-Protocol Label Switching (GMPLS) control plane in photonic networks, new channels were added manually, and as such there was no need to consider the addition or deletion of more than one channel contemporaneously. However, in a GMPLS controlled network it is quite common to have more than one LSP setup or tear down requests at the same time.

Processing such requests in a serial manner has the disadvantage of causing unacceptable delays and traffic loss. However, on the other hand, processing a high number of setup or tear down requests at the same time can cause significant power peaks (positive or negative) and therefore cause service disruptions to the LSPs already in place and carrying traffic.

SUMMARY

It is an aim of the present invention to provide a method and apparatus which obviate or reduce at least one or more of the disadvantages mentioned above. According to a first aspect of the invention there is provided a node for an optical network. The node comprises a first wavelength selective switch coupled to receive a first signal from a signal path. The node also comprises a second wavelength selective switch coupled to receive a backup signal from a backup path. The second wavelength selective switch comprises a backup blocking unit adapted to block the backup signal received at the second wavelength selective switch during a first mode of operation in which the first signal is being received at the first wavelength selective switch.

According to another aspect of the present invention, there is provided a node for an optical network. The node comprises a first wavelength selective switch coupled to transmit a first signal onto a signal path. The node also comprises a second wavelength selective switch coupled to transmit a backup signal onto a backup path. The second wavelength selective switch is adapted to transmit the backup signal onto the backup path while the first wavelength selective switch is transmitting the first signal onto the signal path.

According to another aspect of the present invention, there is provided an optical network configured to provide an optical reroute over a backup path during a failure in a signal path. The network comprises a first node, and a second node coupled to receive a signal from the first node via the signal path, and a backup signal via the backup path. The network is adapted to transmit a signal and a corresponding backup signal from the first node to the second node even when there is no failure in the signal path, wherein the backup signal is blocked at the second node when there is no failure in the signal path.

According to another aspect of the present invention, there is provided a method in a node of an optical network. The method comprises the steps of receiving a first signal from a signal path at a first wavelength selective switch, and receiving a backup signal from a backup path at a second wavelength selective switch. The method also comprises the step of blocking the backup signal received at the second wavelength selective switch during a first mode of operation in which the first signal is being received at the first wavelength selective switch.

According to another aspect of the present invention, there is provided a method in a node of an optical network. The method comprises the steps of transmitting a first signal onto a signal path via a first wavelength selective switch, and transmitting a backup signal onto a backup path via a second wavelength selective switch. The step of transmitting the backup signal onto the backup path is performed while the first signal is being transmitted onto the signal path by the first wavelength selective switch.

According to another aspect of the invention, there is provided a method in an optical network configured to provide an optical reroute over a backup path during a failure in a signal path. The method comprises the steps of transmitting a signal from a first node to a second node via the signal path, and transmitting a backup signal from the first node to the second node via a backup path. The step of transmitting the backup signal via the backup path from the first node to the second node is performed while the first signal is being transmitted from the first node to the second node via the signal path.

The various aspects of the embodiments of the invention enable a faster reroute procedure to be performed.

BRIEF DESCRIPTION OF THE DRAWINGS

For a better understanding of the present invention, and to show more clearly how it may be carried into effect, reference will now be made, by way of example only, to the following drawings in which:

FIGS. 3a and 3b provide further details of a typical node in the network of FIGS. 2a and 2b;

DETAILED DESCRIPTION

The embodiments of the invention described herein enable a fast reroute mechanism to be provided in an optical network, and in particular in a wavelength switched optical network that comprises wavelength selective switches. The embodiments of the invention are based on the broadcast and on the blocking functionalities of a wavelength selective switch (WSS) device. Such WSS devices enable, in the case of a failure of a link, the fast switchover of optical traffic onto local detours within a reduced time.

Figure 4A:
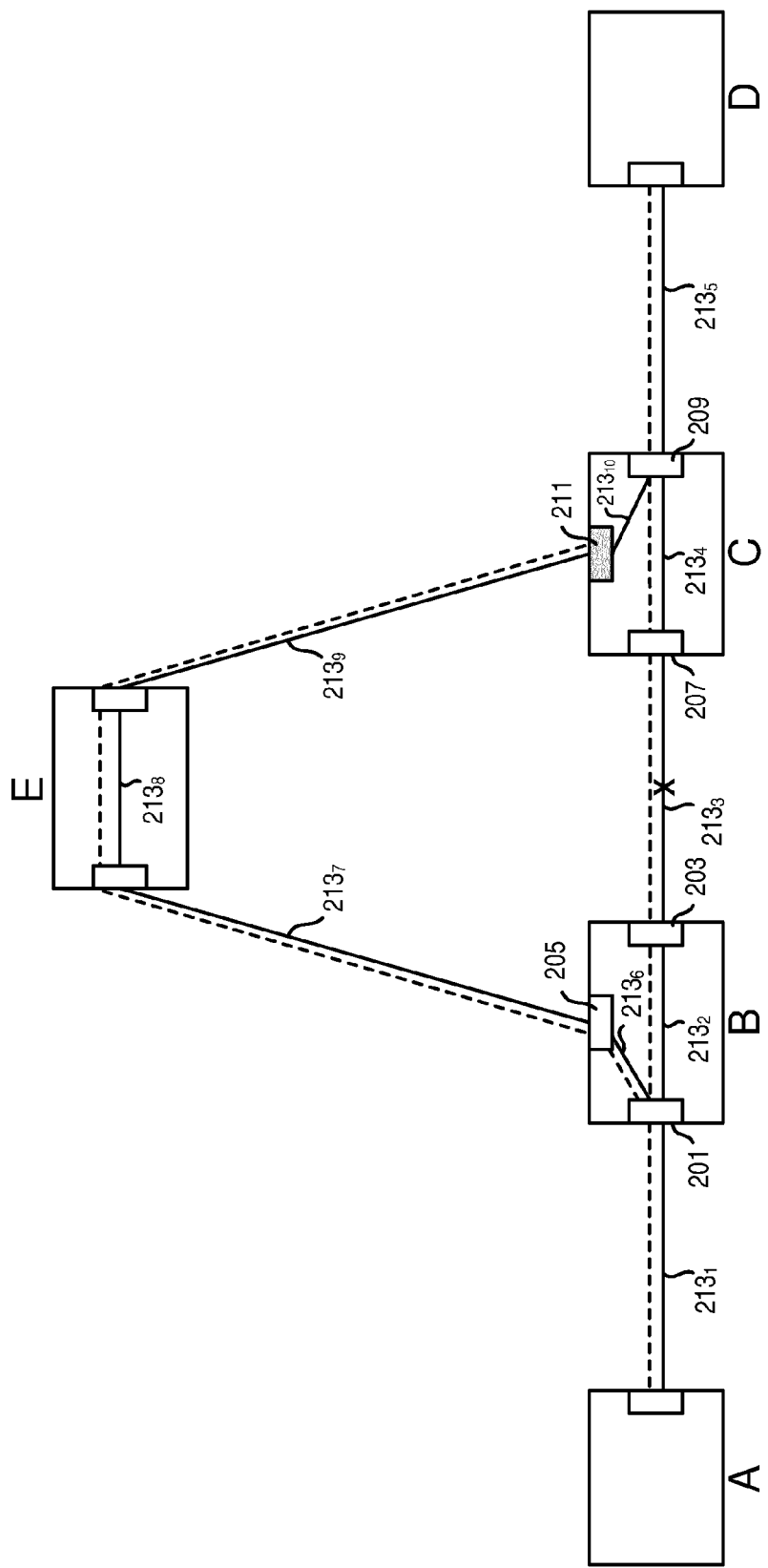
FIGS. 4a and 4b show how a reroute procedure can be implemented according to an embodiment of the invention.
Figure 4B:
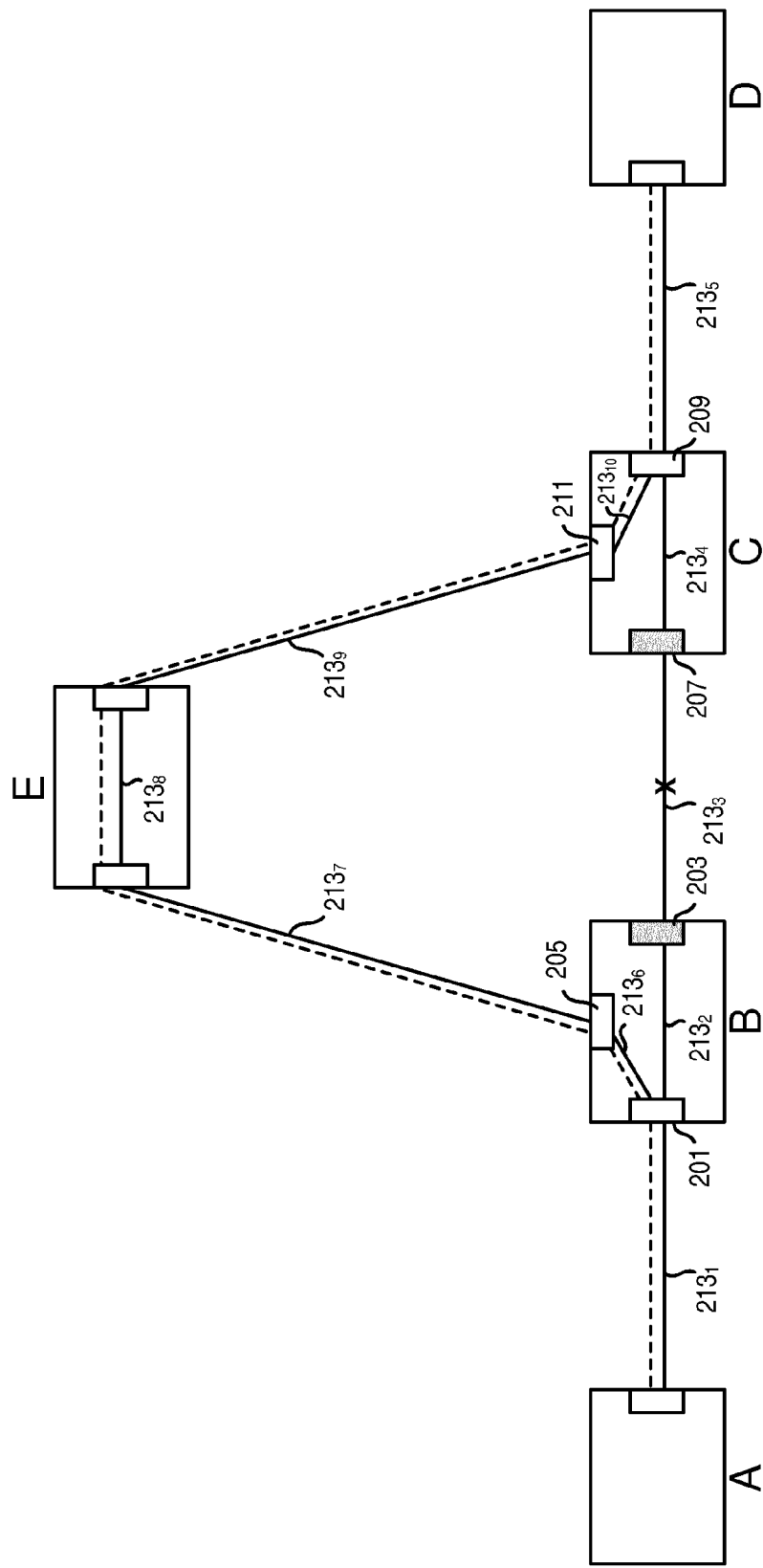

FIGS. 4a and 4b describe how a reroute procedure can be implemented in a network according to embodiments of the present invention.

Referring to FIG. 4a, when transmitting traffic from Node A to Node D, (i.e. along links $213_1$, $213_2$, $213_3$, $213_4$ and $213_5$), a node along this path, for example Node B, is shown as having a duplication of traffic towards Node C and Node E. Traffic is duplicated in node B using the ability of a WSS device to internally broadcast a wavelength, that is duplicating the signal towards more than one outgoing direction, such that the signal is sent to Node C and Node E simultaneously, for example.

Figure 1:
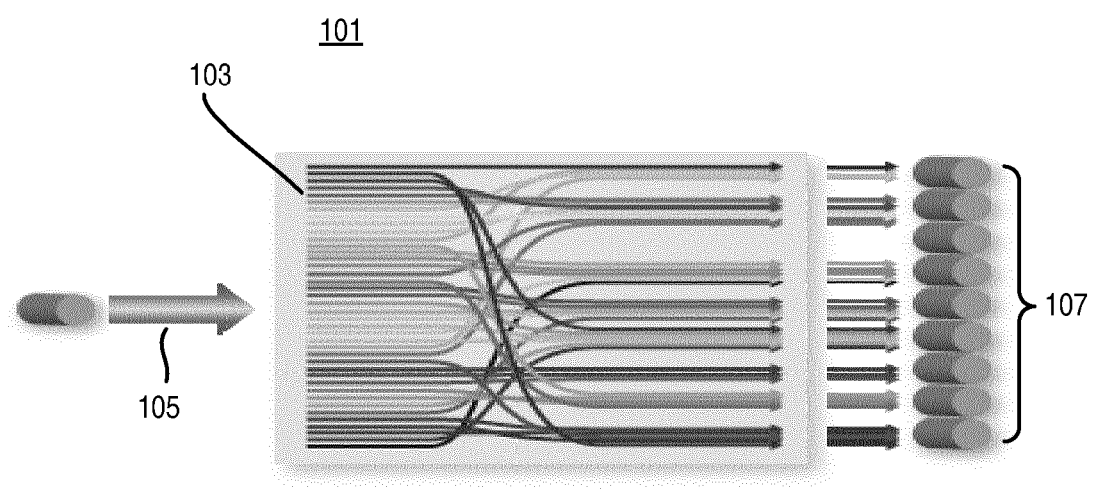
FIG. 1 shows a basic logical scheme of a 1×N Wavelength Selective Switching (WSS) device.
Figure 2A:
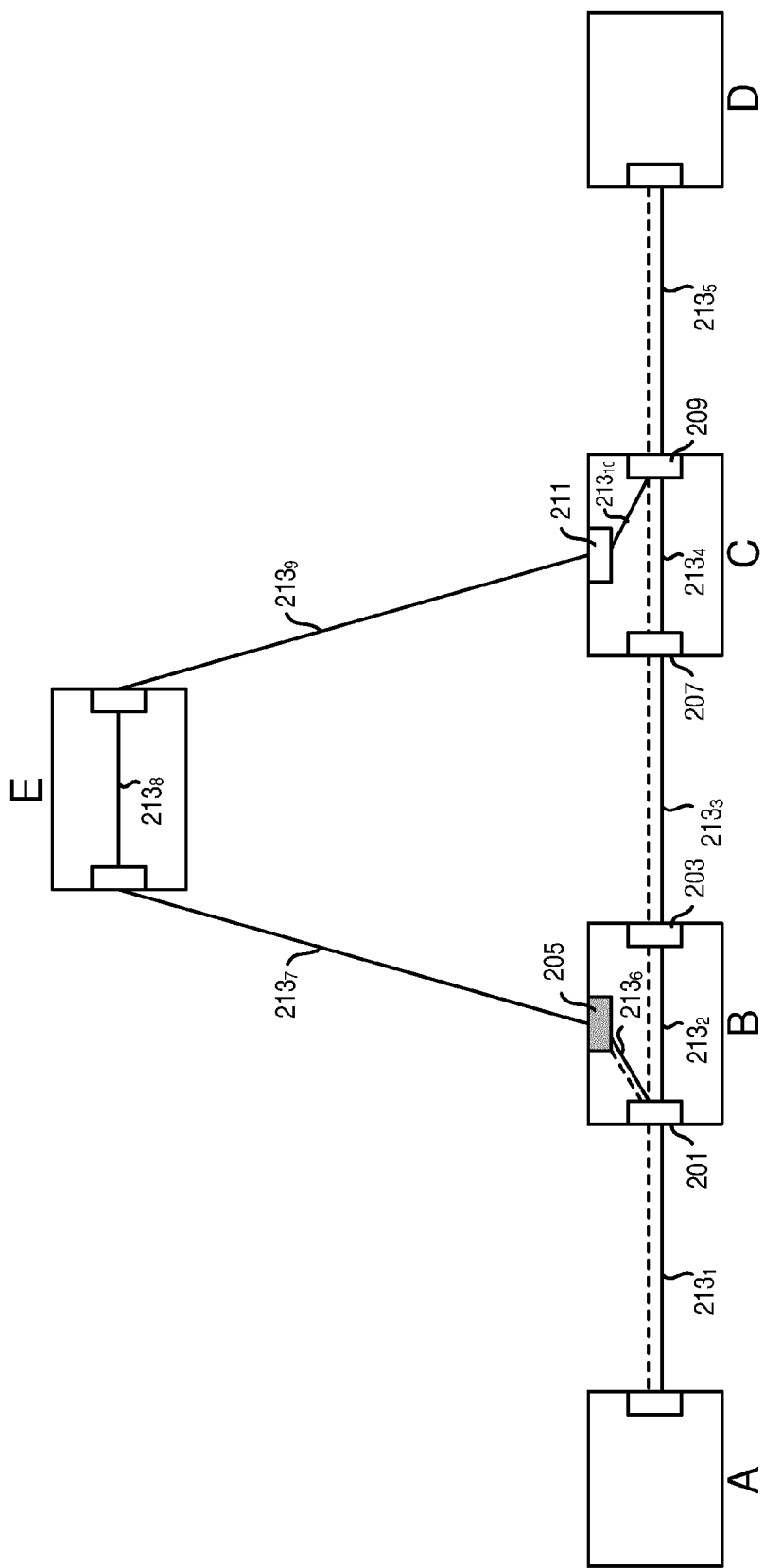
FIGS. 2a and 2b show how a reroute procedure is implemented according to the prior art.
Figure 2B:
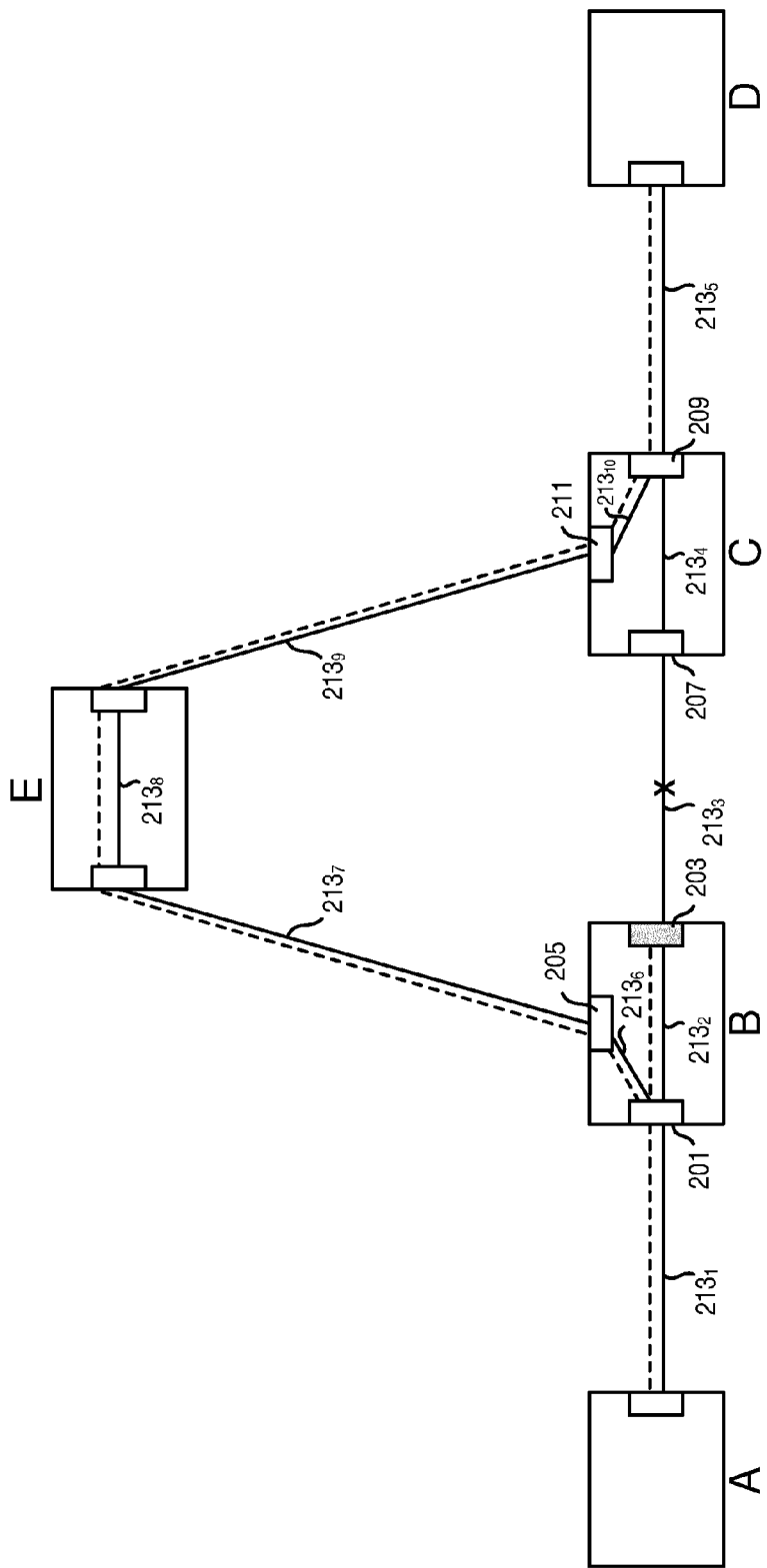

When the link $213_3$ between Node B and Node C is operating correctly, for example in a first mode of operation, the traffic directed to Node E is not blocked at Node B as with FIG. 2a, but is instead blocked at Node C. Therefore, in this mode, the flow of traffic is shown by the dotted lines, whereby the main flow of traffic flows from Node A to Node D along the links $213_1$, $213_2$, $213_3$, $213_4$ and $213_5$, and wherein the flow of duplicated or backup traffic flows along the links $213_1$, $213_6$, $213_7$, $213_8$ and $213_9$. As such, the flow of duplicate or backup traffic is blocked at Node C.

The flow of traffic may be blocked by a blocking unit provided in a wavelength selective switch in Node C. For example, the wavelength selective switch (not shown) may comprise a blocking unit in the form of a mechanism 211 based on Variable Optical Attenuation (VOA). It is noted that the invention is not limited to the use of mechanisms based on VOA, and other mechanism may be used to block the traffic signal.

Referring to FIG. 4b, when a failure occurs in the link $213_3$, for example when operating in a second mode of operation, the VOA 211 is unblocked or tuned to allow traffic to flow through Node C to Node D, (i.e. along the links $213_{10}$, $213_5$), thereby bypassing the failed link $213_3$ with a local detour via Node E. The flow of traffic is shown by the dotted lines, whereby the main flow of traffic flows from Node A to Node B along the links $213_1$, $213_2$, but stops at the VOA 203 because of the failure of the link $213_3$. The duplicated or backup traffic flows from Node A to Node D via the detour from Node B to Node E to Node C, i.e. along the path $213_1$, $213_6$, $213_7$, $213_8$, $213_9$, $213_{10}$ and $213_5$.

Since there is no requirement to set up a new channel in Node B or Node E when rerouting to the backup or duplicate path, i.e. because such a channel is already functioning, then no power leveling or equalization procedures are required, thereby enabling a fast rerouting procedure to be carried out. In other words, the transmission sides (TX) of Node B, Node E and Node C are not affected by a change in the number of transmitted channels and so a power adjustment is not required. This enables a much faster optical rerouting procedure to be performed.

Optionally, when the VOA 211 is opened (unblocked), a VOA 207 coupled to receive the main traffic signal from Node B may be blocked in order to prevent a signal jam from occurring after a failure to link $213_3$ has been corrected or repaired.

This means that in Node C, a wavelength selective switch comprising a signal blocking unit, such as a VOA 207 coupled to the signal path $213_3$, is adapted such that the blocking unit 207 operates in a blocking mode of operation during at least part of the second mode of operation in which the backup blocking unit 211 (connected to the backup path $213_9$) is placed into an unblocked mode of operation.

Figure 5:
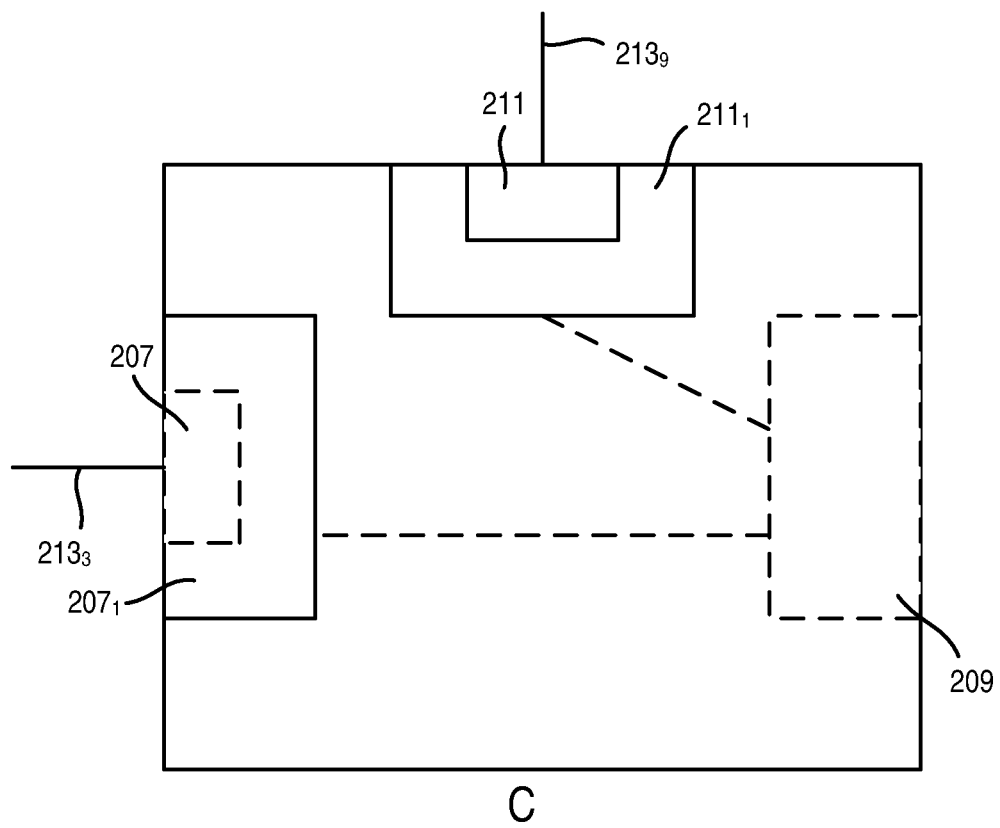
FIG. 5 shows a first node in the network of FIGS. 4a and 4b, according to an embodiment of the invention.

FIG. 5 shows a node according to an embodiment of the invention, for example Node C in FIGS. 4a and 4b.

The node "C" comprises a first wavelength selective switch $207_1$ coupled to receive a first signal from a signal path $213_3$. The node also comprises a second wavelength selective switch $211_1$ coupled to receive a backup signal from a backup path $213_9$. The second wavelength selective switch $211_1$ comprises a backup blocking unit 211 adapted to block the backup signal received at the second wavelength selective switch $211_1$ during a first mode of operation in which the first signal is being received at the first wavelength selective switch $207_1$.

The backup blocking unit 211 is adapted to unblock the backup signal during a second mode of operation in which the first signal is not being received at the first wavelength selective switch $207_1$.

As mentioned above, the blocking unit 207 of the first wavelength selective switch $207_1$ can be optionally adapted to operate in a blocking mode of operation during at least part of the second mode of operation in which the backup blocking unit 211 (connected to the backup path $213_9$) is placed into an unblocked mode of operation.

The signal blocking unit 207 and/or the backup blocking unit 211 may be controlled by a rerouting controller, for example.

The blocking unit 207 and/or the backup blocking unit 211 may comprise a variable optical attenuation (VOA) mechanism.

Figure 6:
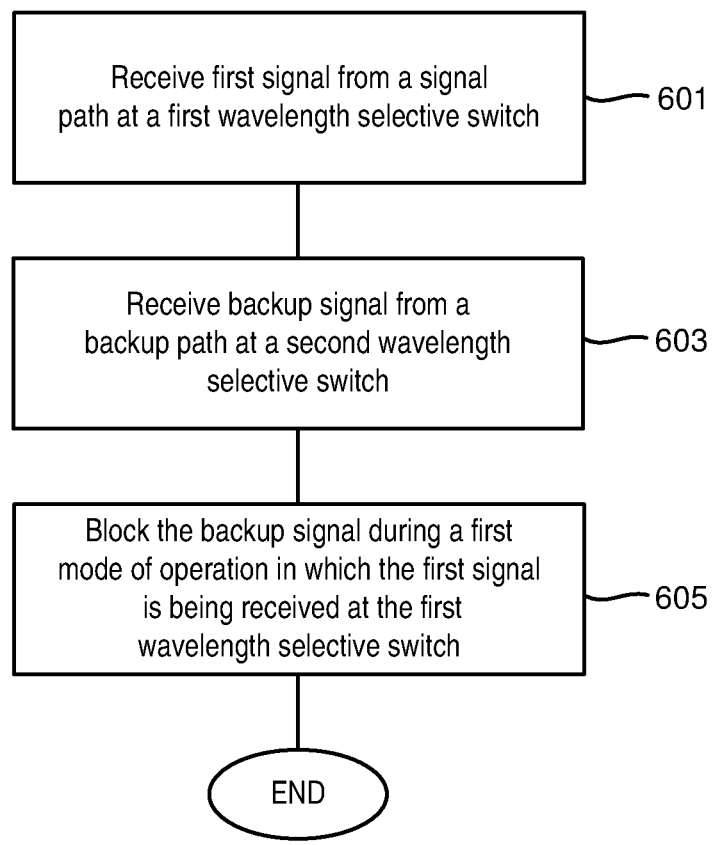
FIG. 6 shows a method performed at the first node, in accordance with an embodiment of the present invention.

FIG. 6 shows a method performed at the first node, for example Node C of FIGS. 4a and 4b, in accordance with an embodiment of the present invention. In step 601a first signal is received from a signal path $213_3$ at a first wavelength selective switch $207_1$. In step 603 a backup signal is received from a backup path $213_9$ at a second wavelength selective switch $211_1$. In step 605 the backup signal received at the second wavelength selective switch $211_1$ is blocked during a first mode of operation in which the first signal is being received at the first wavelength selective switch $207_1$.

Figure 7:
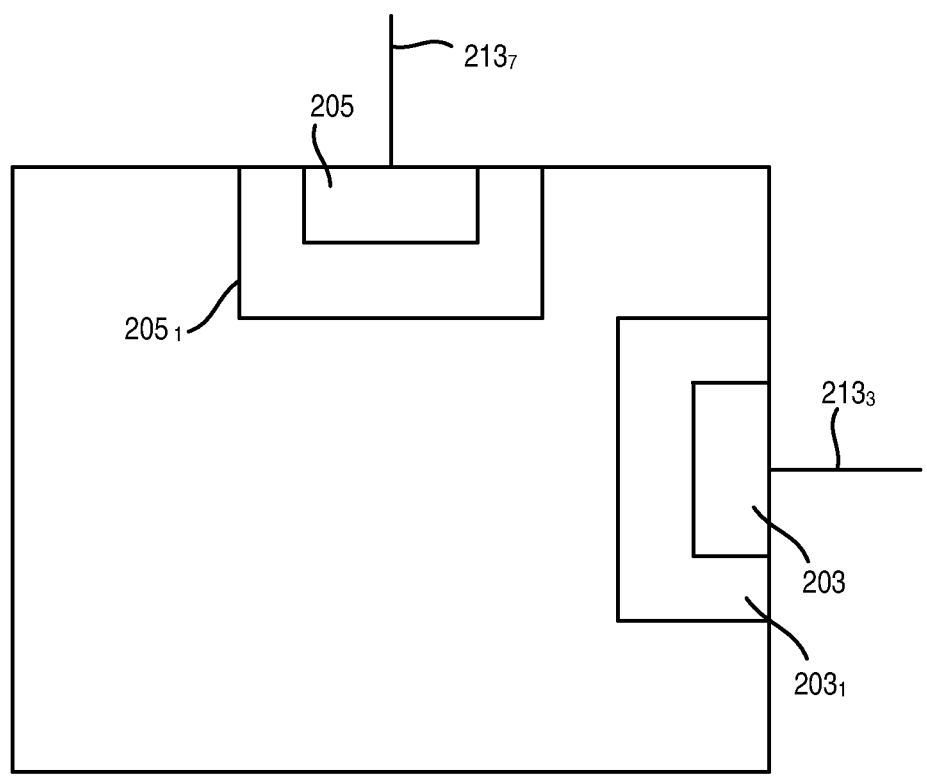
FIG. 7 shows a second node in the network of FIGS. 4a and 4b, according to an embodiment of the invention.

FIG. 7 shows a second node in the network of FIGS. 4a and 4b, for example Node B, according to an embodiment of the invention. The node comprises a first wavelength selective switch $203_1$ coupled to transmit a first signal onto a signal path $213_3$. A second wavelength selective switch $205_1$ is coupled to transmit a backup signal onto a backup path $213_7$. The second wavelength selective switch $205_1$ is adapted to transmit the backup signal onto the backup path $213_7$ while the first wavelength selective switch $203_1$ is transmitting the first signal onto the signal path $213_3$.

Figure 8:
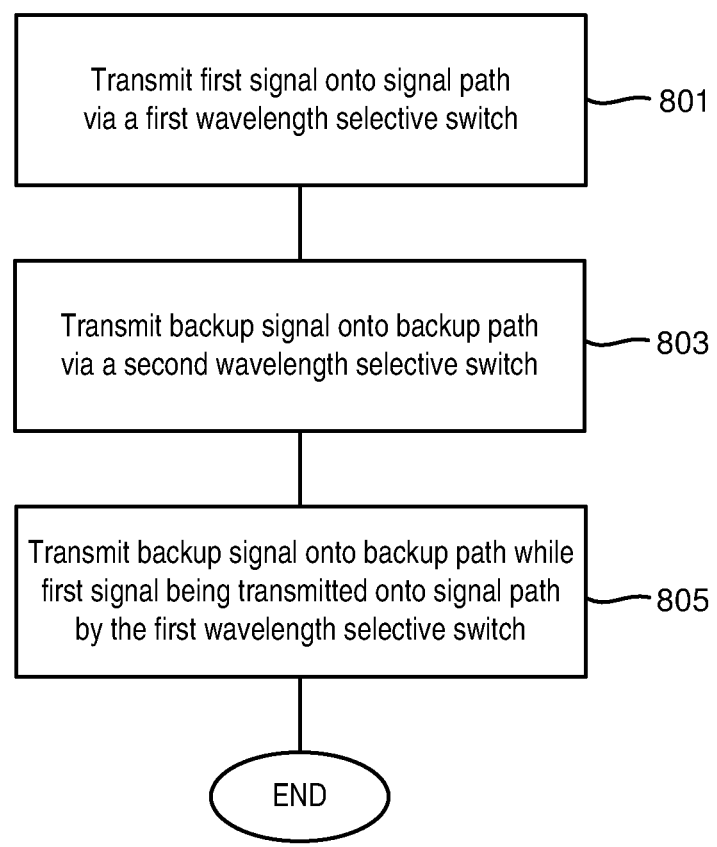
FIG. 8 shows a method performed at the second node, in accordance with an embodiment of the present invention.

FIG. 8 shows a method performed at the second node, for example Node B of FIGS. 4a and 4b, in accordance with an embodiment of the present invention. In step 801a first signal is transmitted onto a signal path $213_3$ via a first wavelength selective switch $203_1$. In step 803 a backup signal is transmitted onto a backup path $213_7$ via a second wavelength selective switch $205_1$. In step 805, the step of transmitting the backup signal onto the backup path $213_7$ is performed while the first signal is being transmitted onto the signal path $213_3$ by the first wavelength selective switch $203_1$.

It will be appreciated from the description of the various embodiments described above that the blocking action of a wavelength selective switch, for example using a VOA, is moved to the node immediately after the span protected with the FRR method.

The invention enables a resiliency mechanism having improved speed of switchover of optical traffic within reduced outage with respect to other optical resiliency mechanisms.

The invention enables one-to-one Fast Re-Routing to be provided in WSON networks, without having undesirable delays during the switchover process.

The invention does not require particular hardware modifications because it leverages on the wavelength blocking feature of WSS devices. In addition, the embodiments of the invention have the advantage of removed the need of power adjustments or equalization on the node immediately upstream of the failure.

Compared to traditional 1+1 protection mechanisms such as Optical Sub-Network Connection Protection (OSNCP) mechanisms, the embodiments of the invention can save on the hardware required, because there is no requirement to duplicate the traffic at the source (which requires a dual transponder feature). Instead, the embodiments of the invention make use of the broadcast capability of a WSS device to feed the traffic towards two directions. For example, in Node B of FIGS. 4a and 4b, the traffic is replicated in the direction B-to-C and B-to-E by a WSS device.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A first node of an optical network, the first node comprising:
   a first port comprising a first blocking unit (BU) for receiving a primary optical signal via a first working signal path, said primary optical signal being transmitted by a second node to the first node via the first working signal path;
   a second port comprising a second BU for receiving a backup optical signal via a first backup signal path while the first BU receives the primary optical signal via the first working signal path, said backup optical signal being transmitted by a third node to the first node via the first backup signal path, the third node being separate and distinct from the second node; and
   a third port, the third port being connected to the first BU via a first internal link and further being connected to the second BU via second internal link, wherein
   the first BU is configured to provide to the third port via the first internal link the primary optical signal during a first mode of operation in which the primary optical signal is being received at the first BU,
   the second BU is adapted to block the backup optical signal received at the second BU during said first mode of operation in which the primary optical signal is being received at the first BU,
   the second BU is further adapted to provide to the third port via the second internal link the backup optical signal during a second mode of operation in which the primary optical signal is not being received at the first BU,
   the third port is configured such that, during the first mode of operation, the third port provides the primary optical signal to a fourth node via a second working signal path,
   the third port is further configured such that, during the second mode of operation, the third port provides the backup optical signal to said fourth node via said second working signal path, and
   the backup optical signal is a duplicate of the primary optical signal.

2. The first node of claim 1, wherein the first BU is adapted to operate in a blocking mode of operation during at least part of the second mode of operation.

3. The first node of claim 1, wherein the first and second BUs are controlled by a rerouting controller.

4. The first node of claim 1, wherein the first and second BUs each comprise a variable optical attenuator (VOA).

5. The first node of claim 1, wherein
   the first working signal path comprises a first link connecting the first node with the second node, and
   the first backup signal path comprises a second link connecting the first node with the third node and a third link connecting the second node with the third node.

6. An optical network configured to provide an optical reroute over a backup path during a failure in a signal path, the network comprising:
   a first node for simultaneously transmitting a primary signal onto the signal path and a backup signal onto a backup path; and
   a second node comprising:
   a first port comprising a first blocking unit (BU) for receiving the primary signal via the signal path;
   a second port comprising a second BU for receiving the backup signal via the backup path while the first BU receives the primary signal via the signal path; and
   a third port, the third port being connected to the first BU via a first internal link and further being connected to the second BU via a second internal link, wherein
   the first BU is configured to provide to the third port via the first internal link the primary signal during a first mode of operation in which the primary signal is being received at the first BU,
   the second BU is adapted to block the backup signal received at the second BU during said first mode of operation in which the primary signal is being received at the first BU,
   the second BU is further adapted to provide to the third port via the second internal link the backup signal during a second mode of operation in which the primary signal is not being received at the first BU,
   the third port is configured such that, during the first mode of operation, the third port provides the primary signal to a third node via a working signal path,
   the third port is further configured such that, during the second mode of operation, the third port provides the backup signal to said third node via said working signal path, and
   the backup signal is a duplicate of the primary signal.

7. The optical network as claimed in claim 6, wherein
   the backup path comprises a third node, a first backup link connecting the first node with the third node, and a second backup link connecting the second node with the third node,
   the third node is configured to receive the backup signal and transmit the backup signal towards the second node while the first node is transmitting the primary signal onto the signal path.

8. A method in a first node of an optical network, wherein the first node comprises a first port comprising a first wavelength selective switch (WSS), a second port comprising a second WSS, a third port, a first internal link connecting the first WSS with the third port, and a second internal link connecting the second WSS with the third port, the method comprising:
   receiving at the first WSS a primary signal;
   while the first WSS is receiving the primary signal, receiving at the second WSS a backup signal;
   the first WSS forwarding the primary signal to the third port via the first internal link;
   the third port receiving the primary signal from the first WSS and forwarding the primary signal to a second node of the optical network via a working link;
   while the first WSS is receiving the primary signal, the second WSS refraining from forwarding the backup signal to the third port, wherein
   the backup signal is a duplicate of the primary signal.

9. The method of claim 8, further comprising
   detecting that the first WSS is no longer receiving the primary signal;

as a result of detecting that the first WSS is no longer receiving the primary signal, configuring the second WSS such that the second WSS forwards the backup signal to the third port via the second internal link and configuring the third port to forward the backup signal to the second node via the working link.

10. The method of claim 8, further comprising:

blocking a signal received at the first WSS during a period of time during which the second WSS is configured to forward the backup signal to the third port.

11. The method of claim 10, wherein the blocking is done in accordance with a rerouting procedure.

12. The method of claim 8, wherein the refraining step is performed using a variable optical attenuation, VOA, mechanism.

* * * * *